United States Patent [19]

Wirth

[11] Patent Number: 4,638,892
[45] Date of Patent: Jan. 27, 1987

[54] LINK JOINT BETWEEN A BRAKE CYLINDER AND A BRAKE LINKAGE

[75] Inventor: Xaver Wirth, Ismaning, Fed. Rep. of Germany

[73] Assignee: Knorr-Bremse AG, Munich, Fed. Rep. of Germany

[21] Appl. No.: 810,485

[22] Filed: Dec. 19, 1985

[30] Foreign Application Priority Data

Dec. 21, 1984 [DE] Fed. Rep. of Germany ....... 3447747

[51] Int. Cl.$^4$ ..................... F16D 55/224; F16D 65/28
[52] U.S. Cl. ..................................... 188/59; 188/72.6; 188/212
[58] Field of Search ................. 188/59, 153 R, 204 R, 188/212, 217, 72.6

[56] References Cited

U.S. PATENT DOCUMENTS 2,374,859  5/1945  Gaenssle .............................. 188/59
4,060,153  11/1977 Kobelt ................................ 188/72.6
4,580,663  4/1986  Lehnert ................................ 188/59

FOREIGN PATENT DOCUMENTS 2026544 10/1971 Fed. Rep. of Germany .
2724473 12/1978 Fed. Rep. of Germany ..... 188/72.6

Primary Examiner—Douglas C. Butler
Assistant Examiner—Richard R. Diefendorf
Attorney, Agent, or Firm—Pollock, Vande Sande & Priddy

[57] ABSTRACT

The link joint between a brake cylinder (1) and a brake linkage has a bearing lug (4) attached to a brake cylinder part (2,3). For a pivoting connection between the two, an annular turning surface bearing (14,18) is provided for. The bearing lug (4) is pierced by screw bolts (23) with lateral play, which are screwed to the brake cylinder part (2,3) and the head portions (26) of which are supported by disc springs (28) against the contact point (27) on the bearing lug (4). The rotational center or axis of the turning surface bearing (14,18) is located on the brake cylinder axis (10) in the plane of the contact point (27). With a spherical turning surface bearing (14,18) it is possible to achieve, by an adjusting spring (29), rotatability of the bearing lugs (4) only about a straight line through the ball center (15) of the spherical turning surface bearing (14,18), perpendicular to the brake cylinder axis (10) and the longitudinal axis of the adjusting spring (29).

9 Claims, 5 Drawing Figures

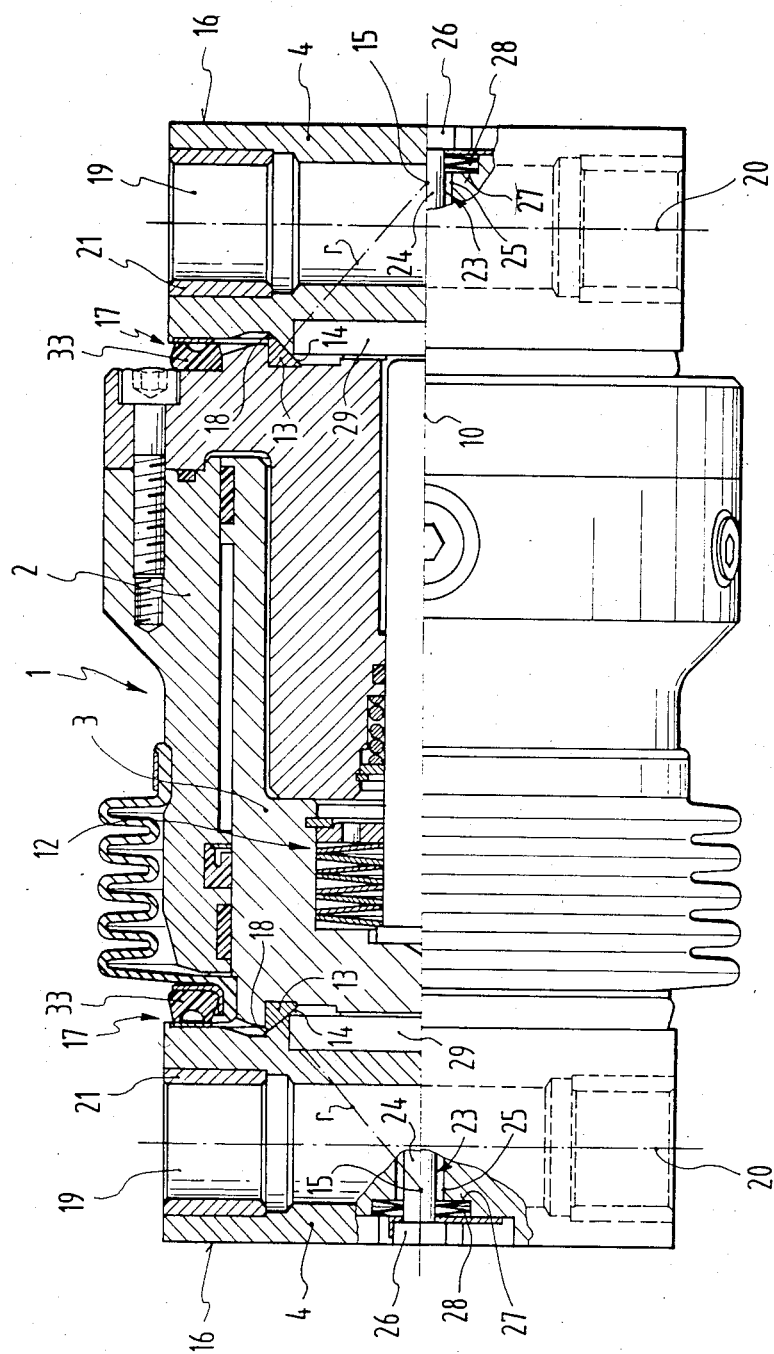

LINK JOINT BETWEEN A BRAKE CYLINDER AND A BRAKE LINKAGE

FIELD OF THE INVENTION

The invention relates to a link joint between a brake cylinder and a brake linkage, especially for a brake cylinder arranged between the brake lever ends of braking pincers for rail vehicle disc brakes with a bearing lug, mounted in a pivotable manner on a brake cylinder part, representing the housing or the piston rod, by means of a turning surface bearing symmetrical to the brake cylinder axis, to which a brake linkage part, possibly the brake lever end, is coupled in a manner which permits rotation around a crossbolt.

During braking actions, these types of link joints must transmit high pressure forces, but otherwise only slight tensile forces resulting from return springs, the coupling angles between the parts to be joined by the link joint then being always relatively small.

BACKGROUND OF THE INVENTION

German Published Patent Application No. 2 026 544 discloses a link joint having the characteristics mentioned above, wherein the turning surface bearing has a bearing ring concentric with the brake cylinder axis, with an outer surface which is also bent in the direction of the brake cylinder axis. In the thus formed spherical turning surface bearing, the bearing surfaces are only slightly inclined towards the brake cylinder axis, so that they are poorly suited for the transmission of high pressure forces.

OBJECT OF THE INVENTION

It is the object of the invention to construct a link joint of the above mentioned type in such a manner that, with simple construction, it can be loaded by high pressure forces and also is capable of meeting the other above mentioned requirements for such a link joint.

SUMMARY OF THE INVENTION

This object is achieved according to the invention by the fact that the turning surface bearing comprises bearing surfaces, narrow with relation to their diameter, and annularly surrounding the brake cylinder axis in the transition area of the bearing lug, facing the brake cylinder part, and is constructed as pre-stressed thrust bearing, wherein the rotational center or axis of the rotation bearing is located, at least near the contact point, flexibly pre-stressed in the pressure direction of at least one screw joint on the bearing lug, located in the area of the surface of the bearing lug facingaway from the brake cylinder, and the screw joint is held, after passing the bearing lug, on the other side on the brake cylinder part with lateral play.

BRIEF DESCRIPTION OF THE DRAWINGS

In order that the invention may be more clearly understood, reference will be made to the accompanying drawings, in which an embodiment of the invention is shown for purposes of illustation, and in which:

FIG. 3 is a cross section through a brake cylinder with bearing lug coupled to a link joint, constructed according to one embodiment of the invention;

DETAILED DESCRIPTION

Figure 1:
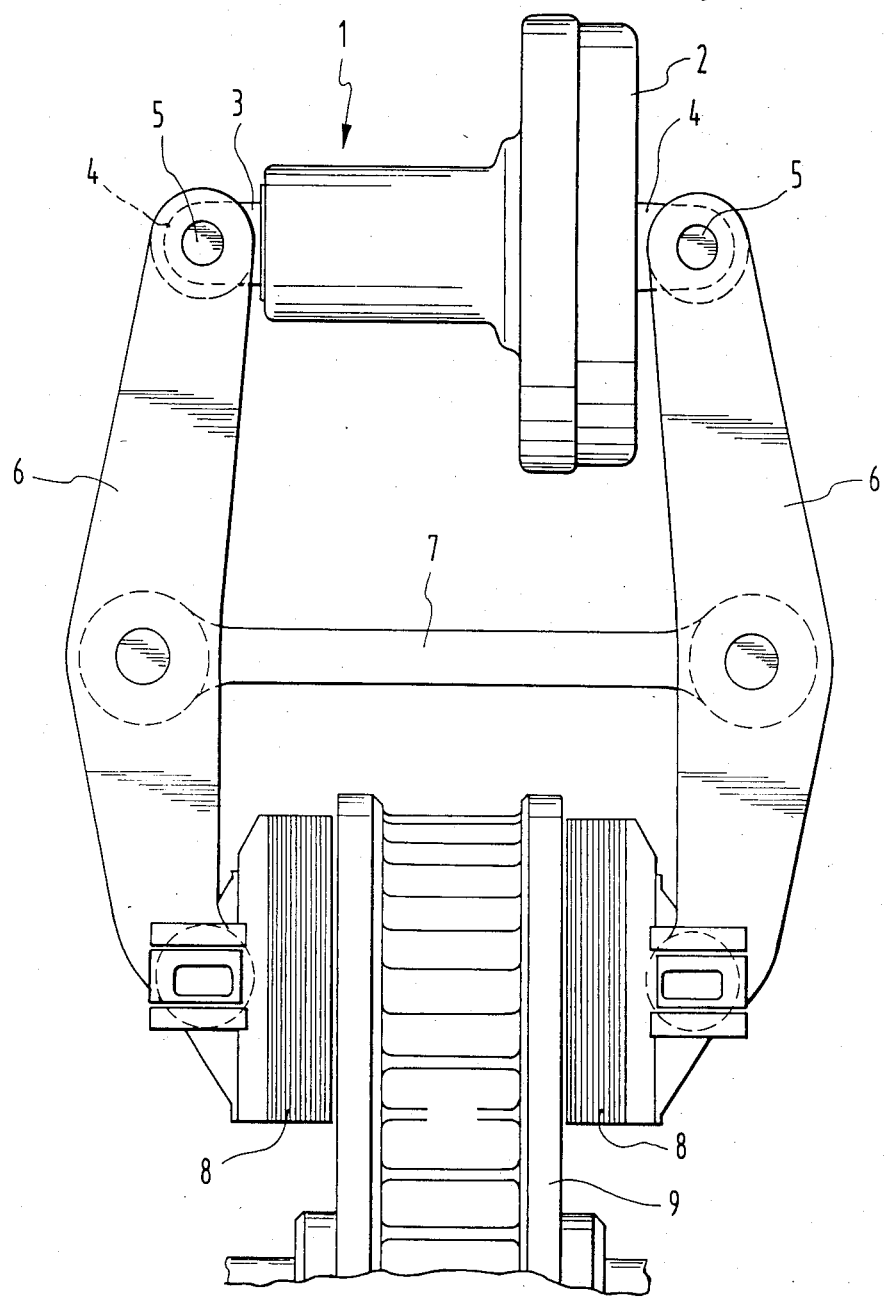
FIG. 1 is a top view of brake pincers for rail vehicle disc brakes.

According to FIG. 1, the brake pincers for rail vehicle disc brakes comprise a brake cylinder 1 with a housing 2 and a piston rod 3. The housing 2 and the piston rod 3 are coupled by means of bearing lugs 4 and crossbolts 5 to the ends of two brake levers 6 associated with the brake pincers. The two brake levers 6 are hingedly connected to each other in their center area by means of a pull rod 7 and carry, on their ends facing away from the brake cylinder 1, brake grippers 8, which can be pressed against a brake disc 9 that extending between these brake grippers. In addition, it is possible to provide hinged levers, (not shown in FIG. 1) and running vertical to the drawing plane, which extends from the brake grippers 8 to the vehicle frame.

Figure 2:
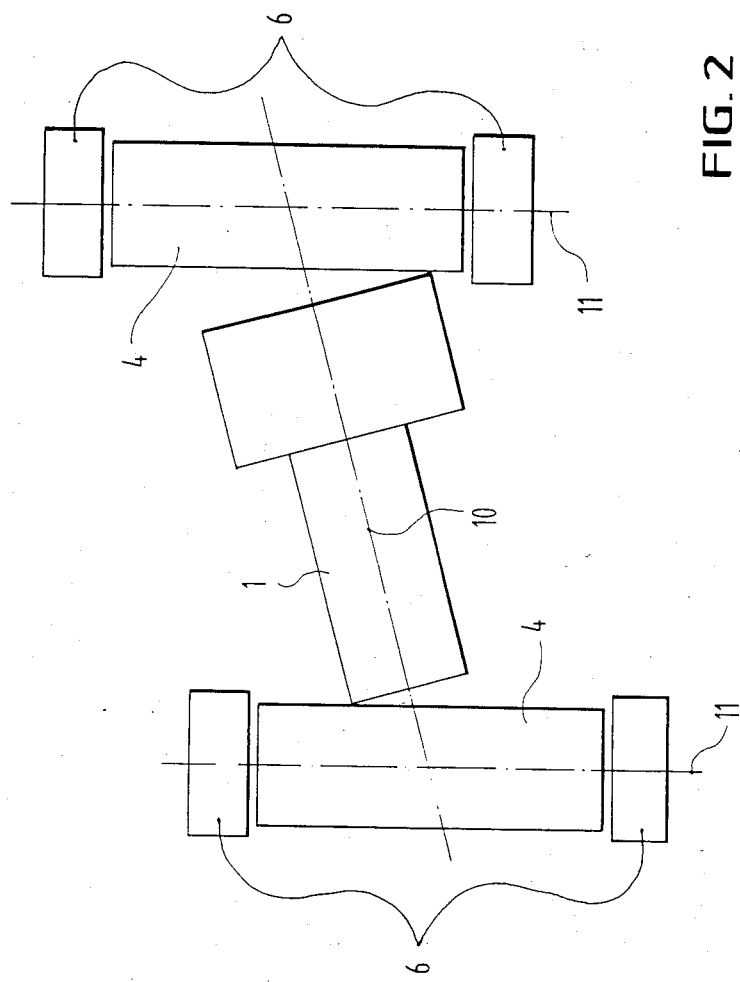
FIG. 2 is a schematic view in the arrow direction X according to FIG. 1 onto the brake pincers, twisted by a slanted setting of the brake disc.

When the vehicle frame or the brake disc 9 is slanted, the brake pincers shown in FIG. 1 can twist in such a manner that the brake levers 6, located on both sides, reach different height locations, as shown schematically in FIG. 2 with exaggerated height displacements of the two brake levers 6.

According to FIG. 2, the brake levers 6 with double-cheek construction are at different heights, the bearing lugs 4, however, remaining vertical. In this situation, the brake cylinder 1 must reach a slanted position between the two brake levers, in such a manner that the brake cylinder axis 10 no longer perpendicularly intersects the axial direction 11 of the crossbolts 5 and thus of the bearing lugs 4.

The angle deviations thus produced between the brake cylinder axis 10 and the axial directions 11 must be absorbed by suitable link joints between the brake cylinder 1 and the bearing lugs 4.

FIG. 3 shows a brake cylinder 1 with a housing 2 and a piston rod 3 unitary with the brake cylinder piston, a conventional slack adjustment device 12 being arranged between the housing 2 and the piston rod 3. On the front sides facing away from each other, both the housing 2 and the piston rod 3 each carry a bearing ring 13 rigidly connected to them. The bearing rings 13, essentially of the same type, have a relatively large diameter which substantially corresponds to the diameter of the piston rod 3, but their width is, relative to the diameter, relatively small. On the sides facing away from each other, the two bearing rings 13 each have a bearing surface 14, which, according to the illustrated embodiment, forms a ball race surface, the ball center 15 being located close to the surface 16 facing away from the brake cylinder, of bearing lugs 4, which are attached to the housing 2 or the piston rod 3 by means of transition areas 17, and are substantially similar. The ball radii r are indicated in dash-dot lines. The two bearing lugs 4 have bearing surfaces 18, complementary to the bearing surfaces 14 and supported on them, the bearing surfaces 14 and 18 in each case forming a turning surface bearing 14,18. The bearing lugs 4 are provided with cross bores 19, whose axes 20 intersect the brake cylinder axis 10 substantially perpendicular, whose ends are provided with bearing boxes 21 and which serve for receiving and bearing the crossbolts 5 (not shown in FIG. 3). On a straight line 22, shown in FIG. 5, which intersects perpendicularly both the brake cylinder axis 10 as well as the axis 20, are, two screw bolts 23 on each bearing lug 4 are mirror inverted laterally to the brake cylinder axis 10. The shafts 24 of the screw bolts 23 extending parallel to the brake cylinder axis 10 pierce, with radial play, the bores 25 provided in the bearing lugs 4. Disc springs 28 are inserted between the head portion 26 of each screw bolt 23, inserted into the bearing lug 4, more deeply according to FIG. 3 and less deeply according to FIG. 4, and the screw bolt contact point 27 on the bearing lug 4. The ball centers 15 are located on the brake cylinder axis 10 in the area where it pierces the contact points 27. The screw bolts 23 pierce, according to FIG. 4, the bearing lugs 4 and are screwed into the piston rod 3 or the housing 2; in doing so, the screw bolts 23 pierce a surface which is surrounded by the turning surface bearing 14,18 arranged in the transition area 17. In addition, in each transition area 17, approximately inside the turning surface bearing 14,18 there is an adjusting spring 29 extending longitudinally substantially parallel to the axis 20. The ends of the adjusting spring 29 are retained in the bearing lugs 4, while in their center areas, the adjusting springs 29 fit into grooves 30 on the piston rod 3 or the housing 2, there being a play interval 31 between the adjusting spring 29 and the bottom of the groove 30. In this manner the adjusting spring 29 produces a non-rotating connection between the bearing lugs 4 and the housing 2 or the piston rod 3 around both the axis 10 and the axis 20. Despite the spherical rotating surface bearing 14,18 with the bearing surfaces 14 and 18 which represent ball race surfaces, the bearing lugs 4 can be pivoted only about the straight line 22 which extends through the ball center 15, within the limits of the radial play between the shafts 24 and the bores 25. This pivoting range is sufficient for absorbing the pivoting motion between the bearing lugs 4 and the housing 2 or the piston rod 3, as explained with respect to FIG. 2. The tilt of the head rotations 26 relative to the surface of the contact point 27 is absorbed during these pivoting motions of the bearing lugs 4 by the slightly dissimilar compression around the circumference of the disc springs 28.

Figure 5:
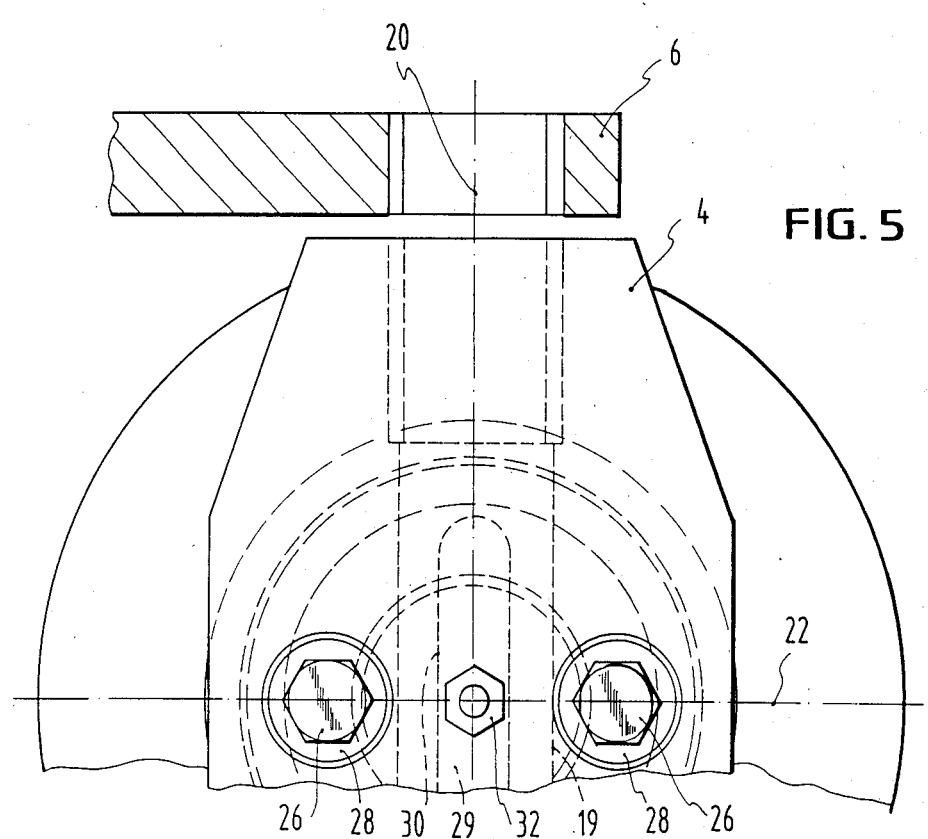
FIG. 5 is a front view of a link joint.
Figure 4:
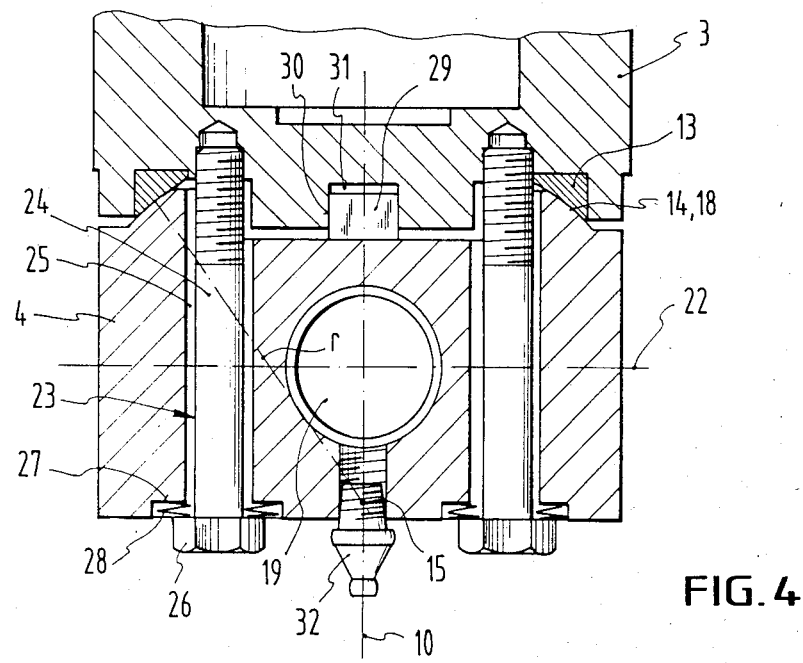
FIG. 4 is a partial section along the brake cylinder axis through a slightly changed link joint.

For lubrication of the crossbolt bearings, the bearing lugs 4 may be provided with lubrication fittings 32 which open into the cross bore 19, as shown in FIGS. 4 and 5.

For the protection of the turning surface bearings 14,18, surrounding sealing rings 33 of flexible material may be inserted between the bearing lugs 4 and the housing 1 or the piston rod 3, as shown in FIG. 3.

It is certainly also possible, to attach the bearing surfaces 14 directly to each brake cylinder part, omitting the bearing rings 13. It is also possible to provide bearing rings on the bearing lugs 4 for carrying the bearing surface 18.

Even if the adjusting spring 29 is omitted, and despite the double arrangement of screw bolts 23 provided for on each of the bearing lugs 4, an eventually desirable, slight spherical mobility of the bearing lugs 4 relative to the brake cylinder 1 can be achieved. With crossbolt bearing for the brake lever 6 which does not pierce the bearing lugs 4, it is also possible to connect each bearing lug 4 to the housing 2 or the piston rod 3 by means of only one screw bolt extending along the brake cylinder axis 10. On the other hand, if only the above-mentioned mobility of the bearing lugs 4 around the straight line 22 as rotational axis is desired, it is also possible, as a variant of the above described embodiments, to provide the turning surface bearing 14,18 not with bearing surfaces 14,17, shaped as ball race surfaces, but with bearing surfaces shaped as cylinder surfaces, wherein the cylinder axis again coincides with the straight line 22 extending though the contact point 27.

As a modification of the above-described embodiments, the scew bolts 23 may end on the bearing lug side with threaded sections, onto which nuts are screwed, which abut, by means of the discs springs 28 against the contact points 27.

In all the embodiments cited above, it is essential that the disc springs 28 press the bearing surfaces of the turning surface bearings 14,18 against each other and thus tightly hold the bearing lug 4 in the transfer direction of the braking forces to be exerted by the brake cylinder 1, in opposite direction with substantial force, actuated by gravity and pivotable to the brake cylinder parts housing 2 and piston rod 3, the disc springs 28 simultaneously absorbing the motions between the head portions 26 and the bearing lugs 4.

What is claimed is:

1. Link joint between a brake cylinder and a brake linkage with brake levers (6), especially for a brake cylinder (1) arranged between the brake levers (6) of a braking pincers for rail vehicle disc brakes, comprising a bearing lug (4), pivotally mounted on a brake cylinder part by means of a turning surface bearing (14, 18) symmetrical to a brake cylinder axis (10), a brake linkage part being coupled to said bearing lug (4) in a manner which permits rotation about a crossbolt (5), wherein said turning surface bearing (14, 18) has bearing surfaces (14, 18) which are narrow with relation to its diameter, which annularly surround said brake cylinder axis (10) and which are situated in a transition area (17) of the bearing lug (4) to said brake cylinder part, wherein said turning surface bearing (14, 18) is constructed as a prestressed thrust bearing, wherein the rotational center (15) of said turning surface bearing (14, 18) is located at least adjacent to a contact point (27) of at least one screw joint of said bearing lug (4), said contact point (27) is flexibly pre-stressed in a pressure direction located in the region of a surface (16) of said bearing lug (4) facing away from aid brake cylinder, and the screw joint is held, after passing through said bearing lug (4) with lateral play, on the other side, on said brake cylinder part (2, 3).

2. Link joint according to claim 1, wherein the bearing surfaces (14,18) are ball races, the ball center (15) being located on the brake cylinder axis (10).

3. Link joint according to any one of claims 1 to 2, wherein the screw joint pierces a surface circumscribed by the bearing surfaces (14,18).

4. Link joint according to any one of claims 1 to 2, wherein the screw joint has a screw bolt having a head portion and extending parallel to the brake cylinder axis (10), the shaft of the screw bolt piercing the bearing lug with lateral play and having a disc spring inserted between its head portion and the bearing lug.

5. Link joint according to any one of claims 1 to 2, wherein the screw joint has two screw bolts (23) which are laterally displaced with respect to the brake cylinder axis (10), each screw bolt having a head portion, the screw bolts (23) extending parallel to the brake cylinder axis 10 and piercing the bearing lug (4) with lateral play and between the head portions (26) of which and the bearing lug (4) disc springs (28) are inserted.

6. Link joint according to claim 5, wherein a straight line (22) which vertically intersects the axes of the screw bolts (23) and the brake cylinder axis (10) extends parallel to a turning axis for the bearing lug (4) through said rotational center.

7. Link joint according to claim 6, whrein the bearing surfaces (14, 18) are ball races, and wherein a cross linkage is provided for in the transition area between the bearing lug (4) and the brake cylinder part (2, 3), which prevents crosswise motions between these two parts parallel to the direction of the straight line (22).

8. Link joint according to claim 7, wherein the cross linkage comprises an adjusting spring (29) attached to the brake cylinder part (2,3), and whose longitudinal direction perpendicularly crosses the straight line (22), the adjusting spring (29) fitting into a groove (30) on the bearing lug, whereby there is play between the adjusting spring (29) and the bottom of the groove.

9. Link joint according to any one of claims 1 to 2, wherein at least one of the bearing surfaces (14,18) is located on a bearing ring (13), which is attached to the brake cylinder part (2,3).

* * * * *